W. J. MILLER.
APPARATUS FOR PRESSING GLASS ARTICLES.
APPLICATION FILED APR. 9, 1913.

1,130,918. Patented Mar. 9, 1915.
6 SHEETS—SHEET 1.

WITNESSES
INVENTOR

W. J. MILLER.
APPARATUS FOR PRESSING GLASS ARTICLES.
APPLICATION FILED APR. 9, 1913.

1,130,918.

Patented Mar. 9, 1915.
6 SHEETS—SHEET 2.

WITNESSES

INVENTOR

W. J. MILLER.
APPARATUS FOR PRESSING GLASS ARTICLES.
APPLICATION FILED APR. 9, 1913.

1,130,918.

Patented Mar. 9, 1915.
6 SHEETS—SHEET 3.

W. J. MILLER.
APPARATUS FOR PRESSING GLASS ARTICLES.
APPLICATION FILED APR. 9, 1913.

1,130,918.

Patented Mar. 9, 1915.
6 SHEETS—SHEET 4.

WITNESSES
J. Herbert Bradley
Wm Heckman

INVENTOR
William J. Miller
by O. M. Clarke
his attorney

W. J. MILLER.
APPARATUS FOR PRESSING GLASS ARTICLES.
APPLICATION FILED APR. 9, 1913.

1,130,918.

Patented Mar. 9, 1915.
6 SHEETS—SHEET 6.

UNITED STATES PATENT OFFICE.

WILLIAM J. MILLER, OF SWISSVALE, PENNSYLVANIA.

APPARATUS FOR PRESSING GLASS ARTICLES.

1,130,918.    Specification of Letters Patent.    Patented Mar. 9, 1915.

Application filed April 9, 1913. Serial No. 760,057.

*To all whom it may concern:*

Be it known that I, WILLIAM J. MILLER, a citizen of the United States, residing at Swissvale, in the county of Allegheny and State of Pennsylvania, have invented certain new and useful Improvements in Apparatus for Pressing Glass Articles, of which the following is a specification.

My invention consists of an improvement in an apparatus or machine for pressing glass articles, and has for its object to provide, in a machine of this type, automatically operative mechanism for performing the several operations, by means of fluid pressure actuated mechanism, embodying initiating, timing, retarding, actuating and locking devices for performing the several operations continuously, under the control of the operator, as shall be more fully hereinafter described.

The machine embodying the improvements is one of a well-known type in which a plurality of glass pressing molds are mounted upon an intermittently rotatable table, the machine having actuating mechanism for intermittently swinging the table and the molds, locking and unlocking the table, cushioning the stroke of the table shifting mechanism, shears and means for actuating them, plunger mechanism and operating mechanism therefor, means for augmenting, maintaining uniform, or reducing the pressure of the plunger in the glass, etc., said parts being actuated by a compressed fluid, as air, and embodying the several features of improvement hereinafter described.

In the drawings illustrating one preferred form of the invention.

The machine as a whole consists of the several main features comprising the frame of the apparatus, embodying a main stationary table 2 carried by any suitable frame work, as columns or legs 3, usually provided with supporting wheels, whereby the apparatus may be moved around upon the floor. Rotatably mounted above the table 2 is the mold supporting table 4 of circular form, revolubly carried on a series of supporting balls 5 running in a suitable annular groove and around a central supporting spindle or standard 6 of well-known construction, or in any other convenient manner, whereby to centralize the mold supporting table for its intermittent revolution and operation. Mounted upon the table 4 are a plurality of glass pressing molds 7, five being shown in the machine illustrated, so located and spaced as to be brought consecutively in register with a pair of shear blades 8 and a pressing plunger 9, located vertically above the molds.

The machine is so designed and the several working parts so proportioned and arranged as to effect the cutting off of the molten glass by the shears when it is held between them above the mold by the workman; to effect shifting rotation of the table carrying the mold and molten glass around one space to register with the plunger; to time the operation of the table shifting mechanism under the control of the initial controlling release valve to provide sufficient time for the cutting and dropping of the glass before the table is actuated; to shift the table and to cushion or retard its actuating mechanism at the end of its movement, avoiding jars or shocks; to then automatically actuate release valve mechanism by an abutment on the table itself to set the plunger mechanism into motion by its controlling valve, embodying timing and pressure-controlling valve mechanism; to withdraw the plunger; and to effect the performance of these several functions through interacting and interdependent fluid pressure connections and mechanism, adapted to carry out the functions without any attention from the operator, after actuating the initial release valve.

The shears are operated by the piston of the fluid-controlled cylinder A. The table 4 is shifted by the piston of the fluid controlled cylinder B, mounted beneath the table with its connected parts, the fluid supply thereto having circulation through a retarding valve C under control of the automatic valve D, which is in direct communication with the initial release or bleeder valve E, the automatic valve D being directly connected to the main air supply pipe S.

The plunger 9 is mounted at the lower end of the usual spindle 10, with the accompanying spring mechanism 11 for cushioning the stroke, vertically sliding by its frame 12 on spindle 13, spindle 10 extending into the plunger cylinder F mounted on the supporting bracket 14, carried by columns 13.

The timer G for the plunger cylinder is mounted on the same bracket, as shown, and is directly connected with the valve casing $f$ of plunger cylinder F, whereby to control the shifting operation thereof. The supply and exhaust of fluid pressure to the cylinder F to effect lowering of the plunger at a predetermined speed and limit of pressure, is controlled by valve $f^2$ and its parts.

Incidentally, the invention has in view to provide plunger mechanism so controlled as to avoid undue pressure of the molten glass within the mold, to prevent "stalling" or interruption of the operation of the plunger due to any obstruction; to control the dwell of the plunger within the glass in the mold, and the amount and pressure of the actuating fluid, independent of the pressure in the main line S. Valve $f^2$ of plunger cylinder F is, like automatic valve D, in direct communication with main air supply S, the operation of the valve $f^2$ and of its controlled plunger being subject to the retarding action of embodied mechanism, hereinafter described.

*Shear mechanism.*—The shear mechanism A consists of a cylinder mounted upon one of the standards 13 having a piston head 15 on the inner end of a stem 16 extending out through the end of the cylinder A, having a terminal cross head 17 provided with pins 18, 18, in notched engagement with the rear outer portions of blades 8, said blades being pivoted on a rivet or stud 19 carried in a suitable support 20 extending out underneath cross head 17. Support 20 is loosely clamped underneath extension support $a$ of cylinder A and is held thereto by bolts $a'$ which pass through extension $a$ and are tapped into a cross bar $a^2$ which in turn is connected by soldering or otherwise to leaf spring $a^3$ extending out underneath the pivoting portions of shear blades 8, to hold them together in shearing contact. By this means bar $a^2$ and support 20 are held tightly in position. The shears and support 20 may thus be bodily removed by loosening bolts $a'$, the construction effecting close adjustment of the shears with relation to each other and the top of the mold, and quick changing of blades. Fluid pressure is supplied to cylinder A by branch pipe 21, which is in direct communication by its upper terminal with the interior of the automatic valve D.

*Plunger cylinder valve.*—The valve controlling the plunger piston is located within valve casing $f$ on top of the cylinder F. At one end of valve casing $f$ is a supplemental valve casing $f^{11}$ having a chamber $f^{12}$ which is in communication with the cylinder F above head F' by pipe $f^{13}$. A small piston $f^{14}$ is mounted within chamber $f^{12}$ and is provided with a stem $f^{15}$ extending loosely through end of valve casing $f$ toward the end of valve $f^2$, designed to limit the movement of said valve to the left, as controlled by set screw abutment $f^{16}$. Leading upwardly from chamber $f^{12}$ at the inner side of piston $f^{14}$ is a small port $f^{17}$ controlled by a check valve $f^{18}$ seated by pressure of spring $f^{19}$ and adjusted as to its pressure by screw $f^{20}$. A port $f^{21}$ opens to the atmosphere beyond valve $f^{18}$.

Figure 9:
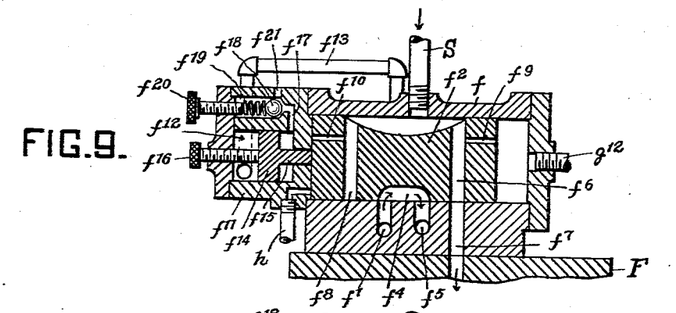
Fig. 9 is a sectional view of the plunger cylinder valve in shifted position, supplying air pressure to the piston.

When valve $f^2$ is thrown over to the left, as in Fig. 9, upon release of pressure from pipe $h$, due to release valve H, port $f^6$ of valve $f^2$ is brought into register with port $f^7$ leading to upper end of cylinder F, and piston F' and plunger 9 descends to the full limit of its downward travel, the plunger entering into the mold 7. The pressure above head F' is limited somewhat by the area of the inlet port $f^7$ and it is desirable that the plunger be maintained in the glass at a pressure considerably less than that of the main supply pipe S, to prevent crushing or straining of the glass, and to maintain the pressure by the plunger at a limited maximum pressure. It is therefore desirable to cut off the pressure on head F' when a predetermined pressure in cylinder F has been reached, and to maintain such reduced pressure on the plunger until the pressing operation is completed, and the plunger withdrawn. It may be also desirable to slightly or gradually increase the pressure after the plunger is in the mold, or to gradually reduce the pressure, before withdrawal from the mold. This is accomplished by the above described construction.

Figure 10:
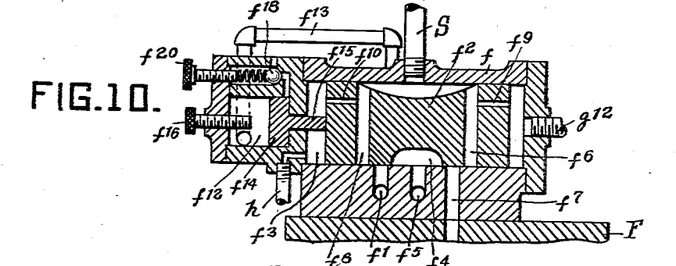
Fig. 10 is a similar view showing all ports closed.

Air pressure from casing $f$ passing through reduced port $f^{10}$ will force head $f^{14}$ back, passing around stem $f^{15}$ and excess pressure will escape to the atmosphere past spring-pressed valve $f^{18}$, leaving head $f^{14}$ thrust over to the left. When valve $f^2$ is shifted over to the left, air enters port $f^7$, and the plunger descends into the glass in the mold, effecting resistance, the pressure above head F' increases until it is automatically cut off by re-shifting of the valve $f^2$. This air pressure passes from cylinder F by pipe $f^{13}$ to chamber $f^{12}$ and, being greater than the reduced pressure at the other side of head $f^{14}$, due to exhaust from port $f^{21}$, said head is shifted over, and its stem $f^{15}$ shifts valve $f^2$ in the reverse direction, closing the supply, as in Fig. 10. If, however, it is desired to gradually increase the pressure on head F, after the plunger is in the mold and the glass has nearly but not quite filled the cavity, to insure further pressure and full formation of the article, the valve $f^2$ may be shifted back only sufficiently far to partly cover supply port $f^7$, as in Fig. 11, by reducing the length of stem $f^{15'}$. If, on the other hand, it is desired to lessen the pressure on the plunger after it is inserted in the glass in the mold, valve $f^2$ may be shifted sufficiently far to cause exhaust port $f^4$ to slightly overlap port $f^7$, as in Fig. 12, by increasing the length of stem $f^{15'}$.

Figure 11:
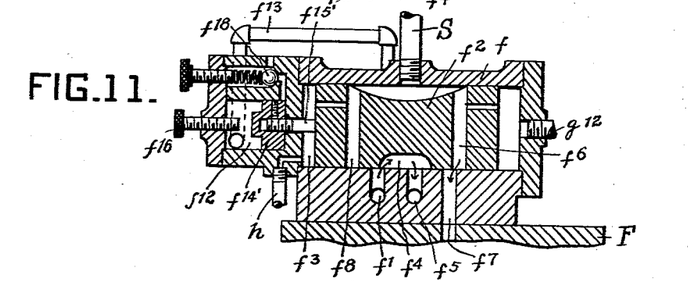
Fig. 11 is a similar view showing the pressure port partly closed and embodying a modified construction.
Figure 12:
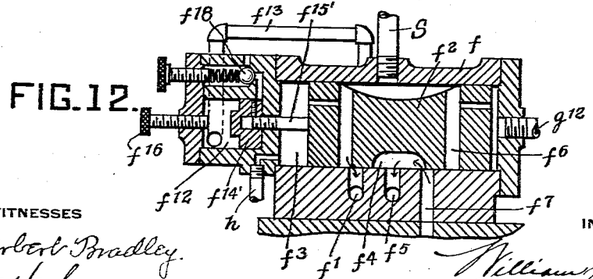
Fig. 12 is a similar view showing the valve partly shifted to throttled exhaust position.

The lengthening or shortening of stem $f^{15}$ may be accomplished by the construction shown in Figs. 11 and 12, wherein the stem $f^{15'}$ is made separate from the head $f^{14'}$ as by screwing its threaded stem into the head and fixedly holding it by a lock nut or screw, as shown, or other suitable means.

It will be readily seen that by controlling the pressure of spring $f^{19}$ by screw $f^{20}$ on check valve $f^{18}$ the operation of said valve in controlling the exhaust of air from behind head $f^{14}$ to the atmosphere may be accurately regulated, so as to determine the resistance to head $f^{14}$ and regulate the operation of said head under pressure by pipe $f^{13}$ from the interior of the cylinder F, so that the pressure on the plunger in the mold may thus be accurately regulated by the outlet valve $f^{18}$. By this means the filling of the mold cavity, around the plunger, may be accurately regulated with varying conditions of quality of glass, etc.

Figures 17, 18, 19, 20, 21:
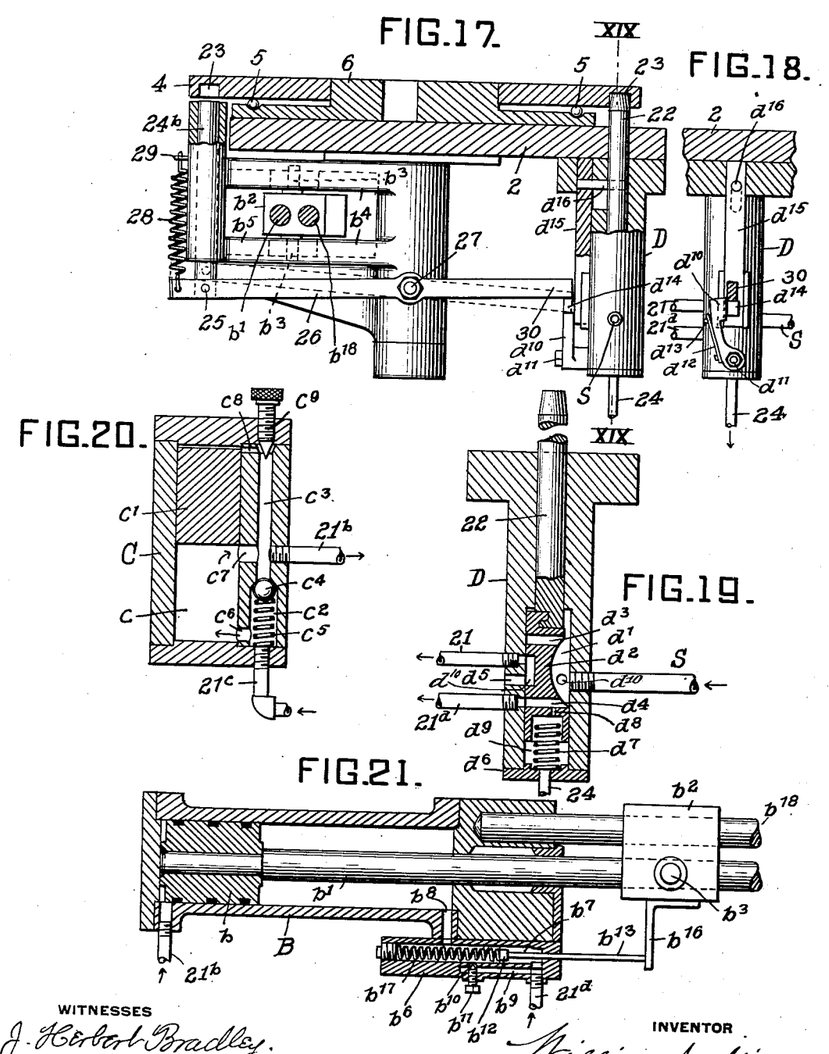
Fig. 17 is an enlarged sectional view, indicated by the line XVII. XVII. of Fig. 6, showing the rotating and locking mechanism for the table.
Fig. 18 is a sectional detail view at right angles to Fig. 17, showing the inner portion of the locking cylinder and the latch device for the shifting lever.
Fig. 19 is an enlarged vertical sectional detail view of the automatic valve mechanism for locking the table, indicated by the line XIX. XIX. of Fig. 17.
Fig. 20 is an enlarged sectional detail view of the retarding valve interposed between the said automatic valve and the shifting cylinder.
Fig. 21 is a horizontal sectional view of the shifting cylinder and its connected parts.
Figures 22, 23:
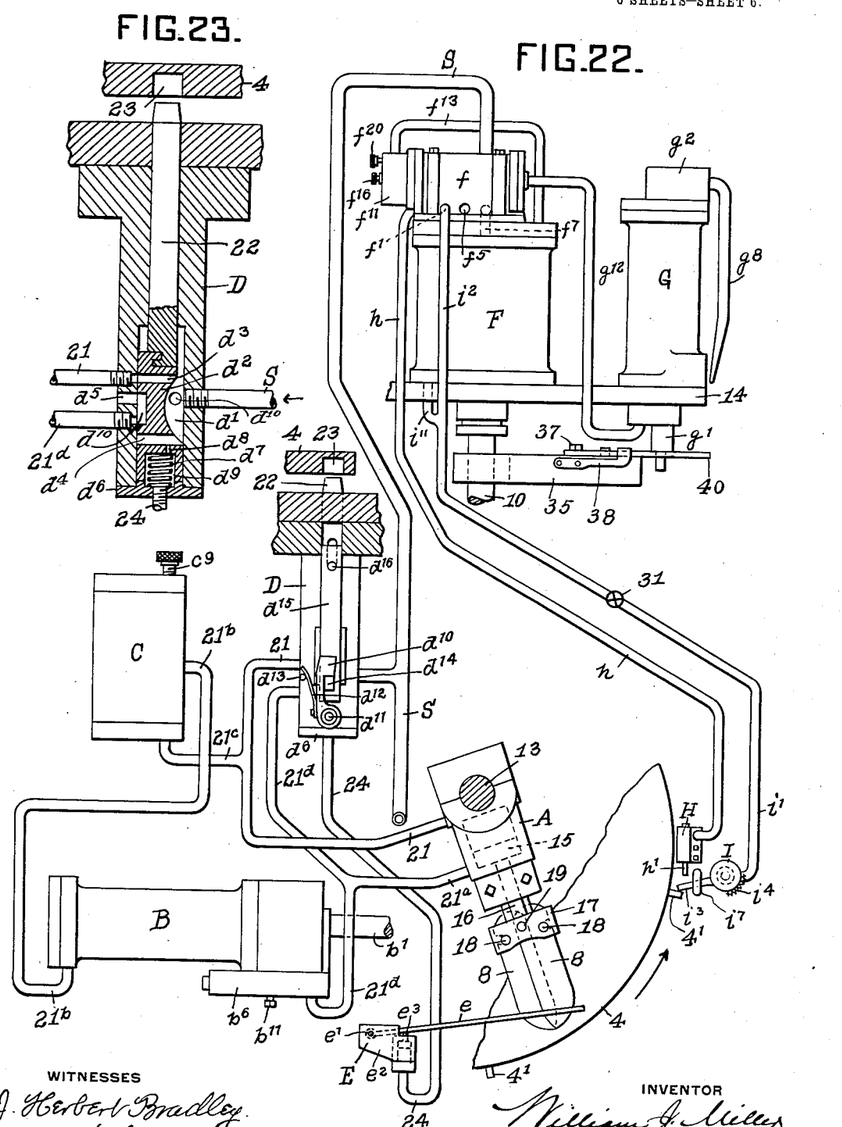
Fig. 22 is a diagrammatic view, showing the several operating parts in segregated arrangement with their connected piping, etc.
Fig. 23 is a sectional detail view like Fig. 19 showing the valve lowered.

*Automatic valve D.*—This valve has a four-fold function; first, to unlock and lock the rotatable table 4 by its reciprocable stem 22 having the tapered terminal adapted to interengage with the registering socket 23 in the under portion of table 4, under control of the initial release valve E; second, to admit direct air pressure to cylinder A to close the shears upon actuation of release valve E, and to open the shears; third, to supply retarded air pressure to table shifting cylinder; and fourth, to supply air pressure to the other end of shifting cylinder B to reverse the shifting mechanism for the next movement. To this end the automatic valve D is provided in its lower portion with a cylindrical valve chamber $d'$, within which is mounted the vertically reciprocating controlling valve $d^2$ connected with the lower end of plunger rod 22, as shown in Figs. 19 and 23, the valve $d^2$ having a reduced middle area or cross section, transverse air supply ports $d^3$ and $d^4$ respectively, and an exhaust port $d^{10}$ adapted to register with pipe 21 or $21^d$ respectively and with port $d^5$ opening to the atmosphere. Inserted between the lower end or cap $d^6$ of the casing of valve D and the lower end of said valve $d^2$ is a cushioning spring $d^7$, a minute leakage port $d^8$ communicating from port $d^4$ to the lower cavity of the casing. Said cavity is in communication with the release or bleeder valve E by a pipe 24, connected at its other end with the lower portion of said valve (see Fig. 22) and the releasing valve is adapted to effect release of air pressure from the said cavity $d^9$ of valve D upon the lowering of a lever $e$ pivoted on the bracket $e^2$ of valve E. Lever $e$ bears downwardly upon a stem $e^3$ of an outlet valve $e^4$, being normally held to its seat by a cushioning spring $e^5$ within a valve casing $e^6$.

It will be understood that, in the operation of the machine, the workman having lowered the molten glass on the end of his punty rod into the upper portion of the mold and in register with the shear blades 8, he lowers the punty rod upon lever $e$ at the proper moment, thereby releasing pressure through pipe 24 from cavity $d^9$, whereupon the air pressure in valve chamber $d'$ immediately lowers valve $d^2$, bringing port $d^3$ into register with pipe connection 21 and its inner terminal communicating port, thereby establishing fluid pressure by pipe 21 to the inner end of shear cylinder A, actuating plunger 15 outwardly, cutting off the glass, and dropping it into the mold.

*Shifting cylinder and retarding valve.*— It is desirable that the operation of the rotatable table to carry the filled mold around into the next position in register with plunger 9 be temporarily retarded after the admission of air pressure to the shear cylinder in order to give sufficient time for the sheared glass unit to settle within the mold, and for such purpose I provide the

*Retarding valve C.*—This valve consists of a vertically cylindrical casing within which is a vertical chamber $c$ in which is mounted a snugly fitting weighted reciprocable head $c'$ adapted to open and close circulation ports and effect resulting circulation of main air pressure from branch pipe $21^c$. Said pipe $21^c$ opens into the bottom of the casing C at one side thereof and into the lower end of a chamber $c^2$ having an upwardly extending port $c^3$ and intervening check valve $c^4$ seating against a closing seat, cutting off communication and normally pressed upwardly by a cushioning spring $c^5$, and direct air pressure, when furnished. A port $c^6$ communicates between chamber $c^2$ and main chamber $c$ at the lower end of the casing, a similar port $c^7$ communicating between chamber $c$ and port $c^3$ at a higher level and substantially opposite the inner end of a utilizing supply pipe connection $21^b$, leading to shifting cylinder B. Upon valve $d^2$ of automatic valve D being lowered, upon actuation of releasing valve E, direct air pressure passes to branch pipe $21^c$ and through port $c^6$ underneath weight $c'$, lifting it to the top of cylinder $c$, uncovering port $c^7$ and establishing communication to pipe $21^b$ and shifting cylinder B. At the same time direct air pressure passes upwardly through port $c^3$ and through transverse port $c^8$ to the upper end of chamber $c$, thereby equalizing the pressure and allowing weight $c'$ to fall, and thus cutting off the supply of air to shifting cylinder B, at the termination of its stroke. A controlling valve $c^9$ accurately adjusts the amount of circulation through port $c^8$ in either direction, whereby to adjust or control the speed of operation of the weight $c'$, either upwardly or downwardly. When weight $c'$ is raised, air will pass freely by pipe $21^b$ to shifting cylinder B, operating it before the weight $c'$ falls.

*Shifting cylinder B.*—This cylinder is mounted stationarily in the main frame below stationary table 2 (see Fig. 1), and is designed for shifting table 4 more or less promptly upon cutting off the glass into one of the molds 7, under control of retarding valve C. It is provided with a piston head $b$ and a reciprocable plunger rod $b'$ extending out through one end of the cylinder and connected by a cross head $b^2$ having pins $b^3$ and suitable sliding blocks within a slot $b^4$ of shifting arm $b^5$ rotatably mounted on the central spindle of the machine, and carrying at its outer end a vertically reciprocable shifting pin $24^b$. Said pin, like locking pin 22, is adapted to engage one of the sockets 23 in the under edge portion of rotatable table 4 to shift the table. At its lower end pin $24^b$ is pivotally connected, as at 25, with shifting lever 26 pivoted at 27 on the hub portion of the shifting arm $b^5$ which is rotatably mounted around the central spindle. A spring 28 normally lifts the outer end of lever 26 and pin $24^b$, by its connection with the lever at one end, and with a connecting pin or eye 29 at the other end secured to the housing of pin $24^b$ at the outer end of arm $b^5$. Spring 28 acts to hold pin $24^b$ up against the under side of table 4 during reverse movement of the plunger head $b$ of cylinder B, and to draw it into interlocking engagement with registering socket 23 when thrown back for the next operation, after having shifted the table.

Upon admission of fluid pressure by pipe $21^b$ through the retarding valve, as above described, upon lowering of valve $d^2$, the inner end 30 of lever 26, (being lowered to the position indicated in dotted lines in Fig. 17) rides around and engages against the face of locking latch $d^{10}$. Said latch is pivoted at $d^{11}$ and is provided with a pressure spring $d^{12}$ bearing against an abutment $d^{13}$, tending to normally throw the latch over the projecting end or lug $d^{14}$ of an arm $d^{15}$ connected by pin $d^{16}$ with the central stem 22 of valve D. Arm $d^{15}$ is thus actuated by stem 22 of valve $d^2$ when raised by air pressure in chamber $d'$ and balancing spring $d^7$, upon equalization of pressure in cavity $d'$ and $d^9$ through port $d^8$, upon closing of initiating release valve E. When valve $d^2$ and stem 22 are lowered, however, spring actuated latch $d^{10}$ engages over the top of lug $d^{14}$, holding the valve and stem downwardly, until released. Upon arm extension 30 swinging around upon rotation of the table by actuation of shifting cylinder B, it strikes against the upper end of latch $d^{10}$, throwing it over from engagement, whereupon arm $d^{15}$ rises under action of the air pressure and balancing spring $d^7$, inserting tapered end of plunger 22 in socket 23 to hold the table, and at the same time withdrawing plunger rod $24^b$ from its socket 23, as shown in Fig. 12, ready for the reverse movement upon reversal of plunger $b'$ of shifting cylinder B. Locking spindle 22 will now remain in socket 23 until the next operation of initiating valve E. When valve $d^2$ is shifted upwardly, port $d^4$ registers with pipe $21^d$ leading to the other end of shifting cylinder B. Said pipe $21^d$ opens into the end of a cushioning valve casing $b^6$ having a main cavity $b^7$ communicating by port $b^8$ with the interior of cylinder B and with a by-pass port $b^9$ opening at one end to pipe $21^d$. Port $b^9$ has a small port $b^{10}$ opening to chamber $b^7$ controlled by a screw needledle valve $b^{11}$. A valve $b^{12}$ closes one end of chamber $b^7$ toward supply pipe $21^d$ and is provided with a stem $b^{13}$ extending out beyond the inner end of cylinder B into range of abutment $b^{16}$ on crosshead $b^2$, a spring $b^{17}$ normally pressing valve $b^{12}$ to its seat to close circulation to pipe $21^d$, when cross head $b^2$ is beyond end of stem $b^{13}$. Crosshead $b^2$ slides on rod $b^{18}$.

When valve $d^2$ is lowered, giving pressure through pipe $21$—$21^c$—$21^b$ to cylinder B, pipe $21^d$ then registers with the exhaust. Abutment $b^{16}$ is so located on cross head $b^2$ that it will engage stem $b^{13}$ on the back stroke, unseating valve $b^{12}$ and giving free inward circulation to cylinder B from pipe $21^d$. On the forward stroke, valve $b^{12}$ will be held off its seat until piston $b$ has traveled part way, valve $b^{12}$ then seating by spring $b^{17}$ and throttling the exhaust from in front of piston $b$. By reason of this construction piston $b$ will be cushioned at the end of its stroke, the imprisoned air in the other end of the cylinder escaping at a controlled speed through port $b^{10}$ to pipe $21^d$ and by exhaust port $d^{10}$—$d^5$ to the atmosphere. The advantage of this construction and operation is that the momentum of the table 4 is checked at the end of its movement, so that the mold arrives under the plunger, the lever 30 engages latch $d^{10}$, and the several other functions are performed without shock or jar, by easing up the speed of stroke of piston $b$ at the end of its movement.

Figure 15:
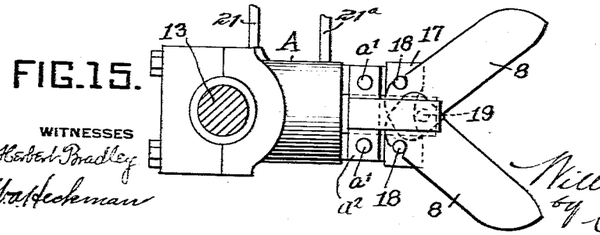
Fig. 15 is an under plan view of the shear mechanism.

After the glass is cut off the operator removes his punty rod from arm $e$, and valve E closes, spring $e^5$ seating valve $e^4$ and closing exhaust from pipe 24. Pressure from pipe S will now pass through reduced port $d^3$ to the lower side of valve $d^2$, equalizing the pressure, and valve $d^2$ will at once rise when latch $d^{10}$ is tripped by arm 30, inserting locking bolt 22 in socket 23 at the termination of the rotation of the table. At the same time port $d^4$ will supply air to pipe $21^d$, (Fig. 23) slightly unseating valve $b^{12}$ and pressure will pass around valve $b^{12}$ to the interior of cylinder B through port $b^8$, acting on piston $b$ and reversing movement of plunger $b'$ and rocker arm $b^5$, pin $24^b$ taking a new hold in the next socket 23 for the next rotation. A branch pipe $21^a$ of pipe $21^d$ being now brought into circulation with port $d^4$ of valve $d^2$, supplies direct air pressure to the front of shear operating piston 15 at the same time that air pressure is supplied to cylinder B by pipe $21^d$, thereby opening the shears, as in Figs. 14 and 15, ready for the next operation. Immediately at the end of the shifting movement of the table, it is desirable that the plunger cylinder F shall be operated to lower plunger 9 into the mold. This is accomplished by means of the

*Release valve H and head I.*—The function of this valve is to release air by its connection $h$ from the end of the casing $f$ of valve $f^2$ to shift valve $f^2$ and admit direct air pressure by port $f^7$ to the upper end of cylinder F to lower the plunger. For such purpose, I provide a vertically reciprocable pressure-actuated gravity head I mounted upon a hollow spindle $i$ in communication by pipe $i'$ and branch $i''$ with the lower end of cylinder F and by branch pipe $i^2$ with pressure port $f'$ of valve casing $f$. When the shifting valve member $f^2$ of said valve casing is in the position shown in Fig. 9, establishing communication with the atmosphere by ports $f^4$, $f^5$, pressure in pipe $i'$ is exhausted and head I falls by gravity.

For the purpose of rendering this device operative to actuate release or bleeder valve H, head I is provided with a laterally extending wing $i^3$ which is normally raised by air pressure in pipe $i'$ into range of a pin $4'$ extending outwardly from the table 4, one of such pins being provided for each particular mold, and corresponding to the annularly spaced positions thereof.

Vertically reciprocable head I is lowered by means of a spring $i^4$ connected at its lower end to a retaining pin $f^5$ and arranged somewhat spirally around the outer portion of head I and connected thereto by a pin or attachment $i^6$, so as to effect a twisting or turning movement to head I as it is lowered below pin $4'$, effecting a similar turning movement of the wing $i^3$ outwardly away from the stem $h'$ of the release valve H.

A valve or cock 31 is interposed in line of pipe $i'$ so that the operation of valve $f^2$ of the plunger cylinder may be rendered inoperative, by cutting off air supply to head I whereby wing $i^3$ is maintained in a lowered position until valve 31 is opened. This is of advantage whenever it is desired to operate the machine without actuating the plunger.

Figures 1, 2, 3, 4:
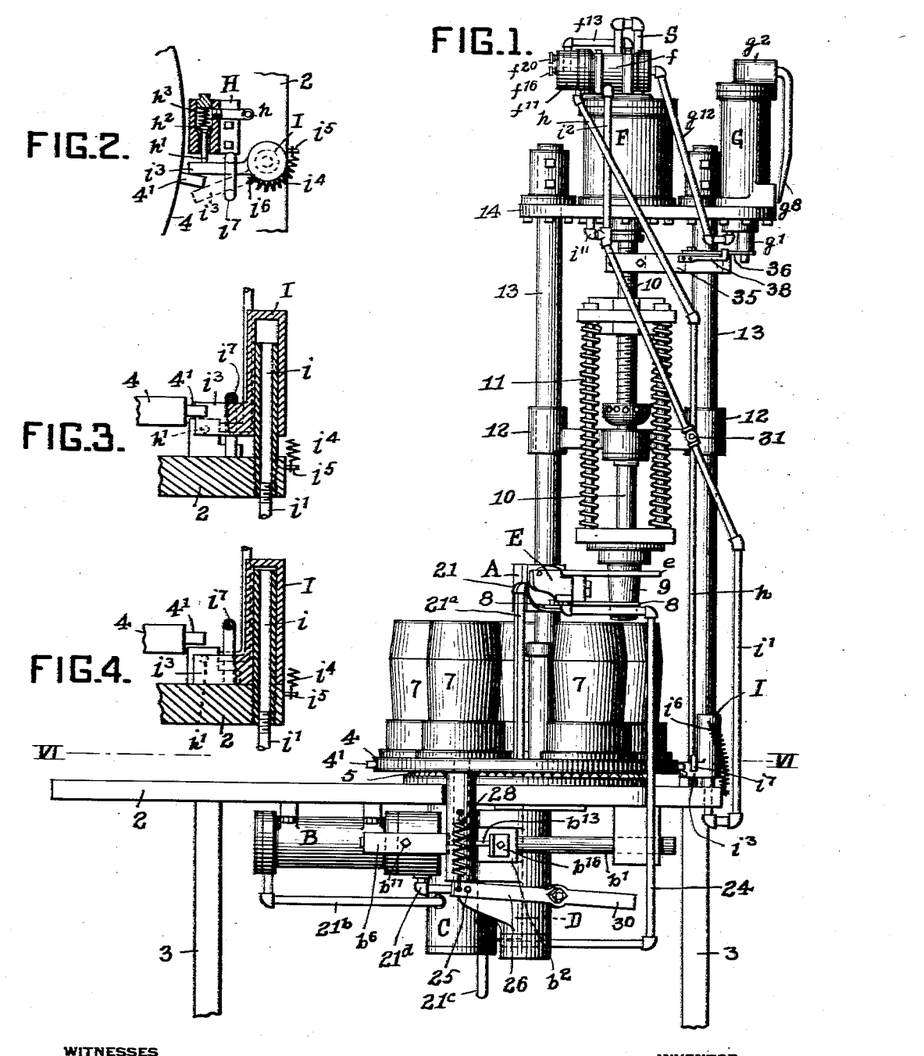
Figure 1 is a view of the machine in side elevation.
Figs. 2, 3 and 4 are detail sectional views in plan and vertical section respectively, illustrating the table operated releasing valve mechanism.
Figure 5:
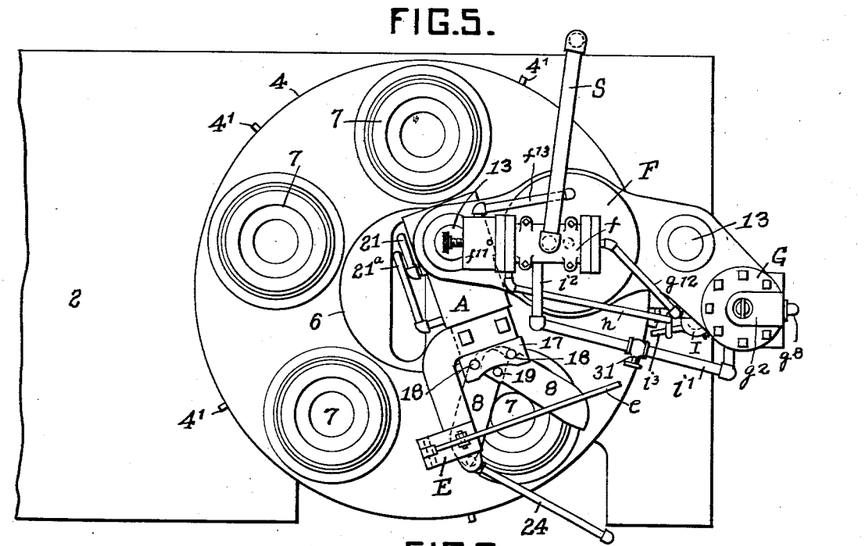
Fig. 5 is a plan view of the machine of Fig. 1.

Wing $i^3$ is retained as to its lateral or vertical movement by a loop or keeper device $i^7$ (see Figs. 2 and 3). As the table is rotated at the end of its intermittent movement, pin $4'$ strikes against wing $i^3$, then being held erect by pressure in pipe $i'$ which in turn strikes valve stem $h'$, thrusting backwardly valve $h^2$ against spring $h^3$, effecting release of pressure from pipe $h$. The result of this movement is to exhaust air pressure from the cavity $f^3$ of valve casing $f$, whereby valve $f^2$ is shifted over to the left, as stated, bringing port $f'$ into register with exhaust port $f^4$ and with outlet exhaust port $f^5$. (See Fig. 9.) This shifting action of valve $f^2$ also brings port $f^6$ into register with supply port $f^7$, admitting direct air pressure to the upper side of plunger F' and lowering plunger 9 into the glass in the mold.

*Timer G.*—For the purpose of retarding the action of the plunger and of piston head F', I have provided the timer device G consisting of a cylindrical casing having a piston $g$ on a stem $g'$ extending downwardly through its bottom portion, the upper end of cylinder G having a head $g^2$ provided with an outlet port $g^3$ having a retained check valve $g^4$, and an inlet port $g^5$ having a controlling stem $g^6$ provided with a registering port $g^7$. Stem $g^6$ has a downwardly extending arm $g^8$, the terminal of which may be set to the desired degree on the graduated dial $g^9$ for accurately controlling the inflow of atmospheric air through ports $g^5$ and $g^7$ to limit the downward gravitating travel of head $g$.

At the lower end of casing G is a check valve $g^{10}$ having an upwardly extending stem $g^{11}$ adapted to be engaged by the descending head $g$, unseating the valve against pressure of air and spring $g^{13}$, if used, and allowing air to exhaust by pipe connection $g^{12}$ and outlet port $g^{14}$ from the other end of valve casing $f$, thus allowing air pressure in valve casing $f$ to shift valve $f^2$ over again toward the right, bringing port $f^4$ into register with port $f^7$ and exhaust port $f^5$, as stated, allowing exhaust from above piston head F' and thus vacating resistance against upward travel of the plunger 10. The timing of the action of valve $f^2$ may be thus accurately controlled by the setting of arm $g^8$ of timer G. Thus, when valve $f^2$ is shifted over to the left to give air pressure through ports $f^7$—$f^7$ to head F' (Fig. 9), the plunger descends and at the same time port $f'$ registers with exhaust ports $f^4$—$f^5$ to the atmosphere, releasing pressure from pipe $i^2$ and $i'$, allowing the hollow head I to fall, spring $i^4$ pulling it down and at the same time throwing wing $i^3$ downwardly and around underneath table pin 4', releasing the pin for the next intermittent movement of the table and at the same time swinging backwardly from engagement with valve stem $h'$, valve $h^2$ closing by action of spring $h^3$, so that circulation through pipe $h$ is closed.

Valve $f^2$ is provided with a transverse port $f^8$, like port $f^6$, in communication with main air pressure. Small circulating ports $f^9$ and $f^{10}$, which are of less area than the release port controlled by valve $g^{10}$ of timer G and release port of valve H, allow of a throttled circulation of main air pressure to each end of the valve $f^2$ within the casing $f$. The object of this is that timer G and valve H can always exhaust fluid from one end or the other of valve $f^2$ faster than it can enter by these small ports $f^9$ and $f^{10}$. Main air pressure within casing $f$ will now shift valve $f^2$ back to the position shown in Fig. 7, due to the release of pressure in pipe $g^{12}$ by unseating of valve $g^{10}$ by head $g$ of the timer, in connection with elastic pressure of air in pipe $h$ leading to the end of the valve, thus bringing ports $f^7$—$f^4$ into register with atmospheric ports $f^5$, releasing pressure from top of piston head F'. Pipe $i^2$ being now in communication through port $f'$ and port $f^8$ with main air pressure supply within casing $f$, and by branch connection $i''$ with the under side of piston head F', said head and plunger 9 will rise. At the same time air pressure through main pipe $i'$ to hollow head I will lift head I and wing $i^3$, in its spring-retracted position, in front of pin 4', which is now free to travel away from wing $i^3$ around with the movement of the table for the next operation, under the action of cylinder B, as above described. Wing $i^3$ is now in position for engagement by the next table pin 4'.

Figure 6:
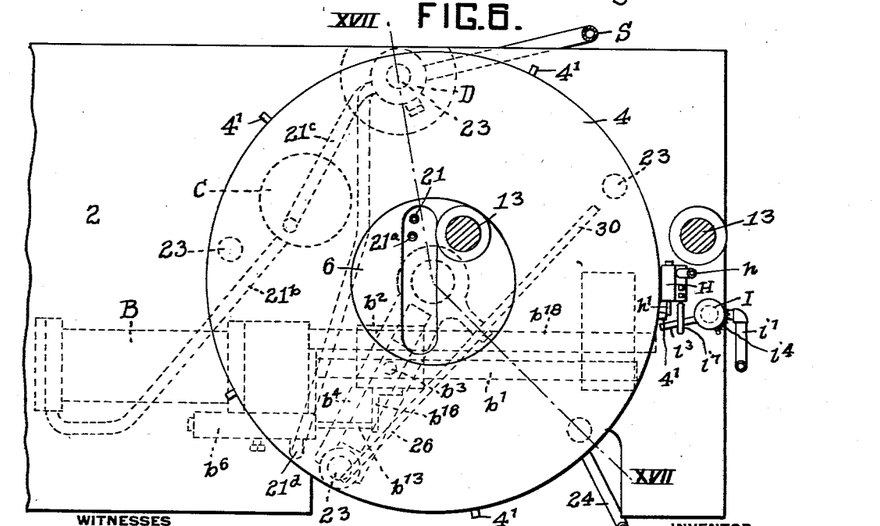
Fig. 6 is a horizontal sectional view, taken on the line VI. VI. of Fig. 1.
Figure 7:
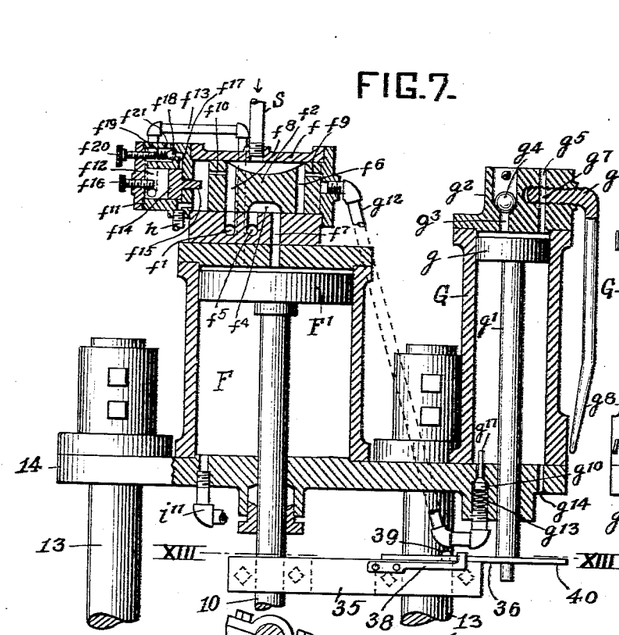
Fig. 7 is a vertical sectional view of the plunger cylinder and valve, the exhaust controlling mechanism, etc.
Figure 8:
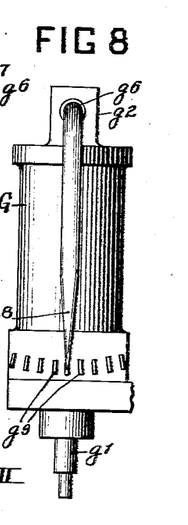
Fig. 8 is a detail view in elevation of the timer device.
Figures 13, 14, 16:
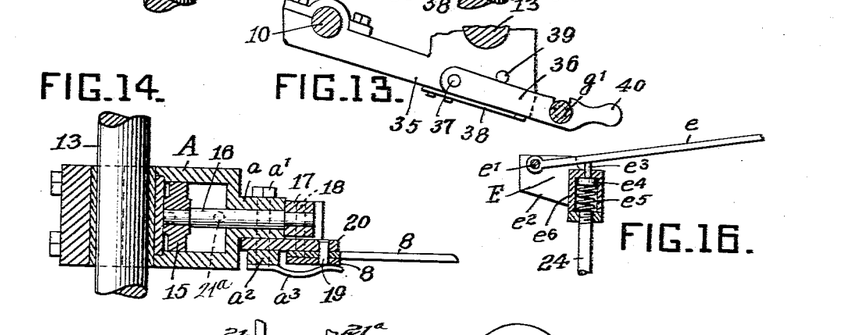
Fig. 13 is a horizontal detail sectional view, taken on the line XIII. XIII. of Fig. 7.
Fig. 14 is a vertical sectional detail view of the shear mechanism.
Fig. 16 is a sectional detail view of the releasing valve for initiating the several operative movements of the different parts.

The plunger rod 10 is provided with a laterally extending arm 35 fixedly secured to the stem, as shown in Figs. 7 and 13, for the purpose of lifting plunger stem $g'$ of the timer G. Arm 35 is provided with a latch 36 pivoted at 37 on the arm and pressed backwardly into normal operative position by a spring 38 against a limiting pin 39, and is provided with a terminal handle portion 40. The purpose of this construction is to enable the operator to at any time throw latch 36 outwardly from registering position with relation to plunger $g'$, so that in the event of plunger 9 being arrested by chilled glass in the mold, or for any other reason, the latch may be thrown out to allow plunger $g$ to descend sufficiently far to insure actuation of release valve $g^{10}$, to provide for shifting of valve $f^2$ to the position shown in Fig. 6, to provide for release of pressure from cylinder F to ports $f^7$—$f^4$—$f^5$. In normal operation, however, latch 36 descending ahead of plunger $g'$, said plunger will perform its functions in unseating valve $g^{10}$ and then fall to operative position slightly above latch 36 for the next operation. This construction enables the operator to lift the plunger $g'$ manually above the latch, and to again place the latch underneath the plunger in the manner described, in case of chilled glass or other obstruction, to the normal operation of the machine.

*Operation.*—The operation is as follows: Compressed air having been supplied to the machine, the operator gathers a lump of glass on the end of his punty rod, dropping a predetermined quantity into the mold under the shears, and when such predetermined quantity has been lowered into the mold, he touches the small lever $e$ of initiating valve E with his punty rod. This immediately causes valve $d^2$ within casing D to fall, admitting air to rear of shear cylinder, closing the shears and cutting off the glass. Meanwhile the air in table shifting mechanism has been retarded from acting immediately by the retarding mechanism described, and after a slight delay, the table is then partially revolved, bringing the charged mold beneath the plunger and simultaneously the next empty mold under the shear. The table being locked, the valve mechanism controlling the operation of the plunger cylinder is actuated and the plunger descends into the mold and more or less fully fills the cavity. The pressure is more or less reduced, or entirely removed, or maintained equally, or slightly increased, by adjustment of the controlling valve mechanism in casing $f^{11}$ at the end of casing $f$, depending on the shape of the article to be formed, the nature of the glass and other conditions that might arise. The object in view is to imitate the action or touch of the human operator handling the lever of a hand-operated machine. When the operator pulls on the lever until he fills the mold full with glass, or nearly so, he then slightly and slowly increases the pressure, maintains it at the same point, slightly reduces it, or entirely removes it, meanwhile holding the plunger in the glass to set the ware properly, holding it there a predetermined time, depending on the article to be formed, and then withdraws it. After the plunger has remained in the glass a predetermined time, depending on the adjustment of $g^8$, it is withdrawn and the machine is ready for the next charge of glass, as previously described. The pressed article is then allowed to set in the mold a longer or shorter time, depending on the ware made, and is either transferred to a blow-mold to be blown into shape, or may be removed from the mold in the completed state.

What I claim is:

1. The combination with the plunger of a glass press and its piston and cylinder, of a casing mounted on said cylinder, a fluid-actuated controlling valve in said casing operable to regulate supply and exhaust to and from said cylinder, a plunger casing on the end of the valve casing in fluid communication therewith and provided with a valve controlled outlet a plunger therein provided with an inwardly disposed stem adapted to abut against said controlling valve, and a fluid conduit connecting the plunger casing with the cylinder above its piston for actuating said plunger and its stem dependent on the resistance to the plunger in the mold.

2. The combination with the plunger of a glass press and its piston and cylinder, of a superimposed valve casing, a fluid actuated controlling valve therein, an abutting plunger therefor, a casing for said plunger in fluid communication with said valve casing and provided with a valve controlled outlet, and a fluid pressure connection between the upper portion of the cylinder and the plunger casing adapted to transmit accumulated pressure from above the piston to the valve plunger upon the glass press plunger encountering resistance of the glass in the mold.

3. The combination with the plunger cylinder and its piston, of a superimposed supply and exhaust controlling valve, means for exhausting pressure from either end of said valve to effect shifting thereof, and a supplemental fluid-actuated plunger and a casing therefor at one end of said controlling valve provided with an adjustable limiting set screw for said plunger to arrest its movement away from said controlling valve and to locate its inner end with relation thereto.

4. The combination with the plunger cylinder and its piston, of a supply and exhaust controlling valve, means for exhausting pressure from either end of said valve to effect shifting, and a device operable to effect reverse movement of the valve controlled by pressure within the plunger cylinder.

5. The combination with the plunger cylinder and its piston, of a supply and exhaust controlling valve, means for exhausting pressure from either end of said valve to effect shifting, and a shiftable head subject to pressure from within the cylinder adapted to reverse the controlling valve.

6. The combination with the plunger cylinder and its piston, of a supply and exhaust controlling valve having ports leading to each end, a casing therefor, pressure reducing connections at each end of said casing, the casing having a supplemental chamber communicating with the interior of the cylinder, and a shiftable head therein having a stem extending through an air circulation opening in the valve casing and adapted to shift the valve.

7. The combination with the plunger cylinder and its piston, of a supply and exhaust controlling valve having ports leading to each end, a casing therefor, pressure reducing connections at each end of said casing, the casing having a supplemental chamber communicating with the interior of the cylinder, and a shiftable head therein having an adjustable stem extending through an air circulation opening in the valve casing and adapted to shift the valve.

8. The combination with the plunger cylinder and its piston, of a supply and exhaust controlling valve having ports leading to each end, a casing therefor, pressure reducing connections at each end of said casing, a supplemental chamber at one end of the valve casing communicating with the interior of the cylinder, a shiftable head therein having a stem extending through an air circulation opening in the end of the valve casing and adapted to shift the valve, and a check valve controlled port leading from the inner side of said head to the atmosphere.

9. The combination with the plunger cylinder and its piston, of a supply and exhaust controlling valve having ports leading to each end, a casing therefor, pressure reducing connections at each end of said casing, a supplemental chamber at one end of the valve casing communicating with the interior of the cylinder, a shiftable head therein having a stem extending through an air circulation opening in the end of the valve casing and adapted to shift the valve, a port leading from the inner side of said head to the atmosphere, and a spring-pressed valve therefor.

10. The combination with the plunger cylinder and its piston, of a supply and exhaust controlling valve having ports leading to each end, a casing therefor, pressure reducing connections at each end of said casing, a supplemental chamber at one end of the valve casing communicating with the interior of the cylinder, a shiftable head therein having a stem extending through an air circulation opening in the end of the valve casing and adapted to shift the valve, a port leading from the inner side of said head to the atmosphere, a spring pressed valve therefor, and an adjusting screw for adjusting the spring pressure thereof.

11. In an apparatus for pressing glass articles, a plunger cylinder having a plunger piston, a balanced valve controlling the supply and exhaust of air to and from said cylinder, automatically operative pressure release valves operable to release pressure from either end of the balanced valve to effect shifting of the valve toward said end, a fluid-actuated shifting plunger adapted to engage one end of the balanced valve, and a limiting device therefor adapted to arrest movement of said plunger backwardly from said balanced valve.

12. In an apparatus for pressing glass articles, a plunger cylinder having a plunger piston, a balanced valve controlling the supply and exhaust of air to and from said cylinder, an automatically operated pressure release valve operable to release pressure from one end of the valve to effect shifting of the valve toward said end, and a reverse shifting device operable by pressure from within the plunger cylinder.

13. In an apparatus for pressing glass articles, the combination of a plunger cylinder and piston, a supply and exhaust valve therefor, a rotatable mold table, and a release valve actuated by the table connected with one end of said valve adapted to effect shifting thereof to admit pressure to the plunger piston.

14. In an apparatus for pressing glass articles, the combination of a plunger cylinder and piston, a supply and exhaust valve therefor, a rotatable mold table having radial abutments, a release valve communicating with one end of said valve having a projecting stem, and a pressure controlled adjustable device communicating with the supply and exhaust valve adapted to transmit movement from one of said radial abutments to the stem of the release valve.

15. In an apparatus for pressing glass articles, the combination of a plunger cylinder and piston, a supply and exhaust valve therefor, a rotatable mold table having radial abutments, a release valve communicating with one end of said valve having a projecting stem, and a pressure controlled adjustable device communicating with the supply and exhaust valve adapted to transmit movement from one of said radial abutments to the stem of the release valve and to be withdrawn for continued movement of said abutment with the table.

16. In an apparatus for pressing glass articles, the combination of a plunger cylinder and piston, a supply and exhaust valve therefor, a rotatable mold table having a projecting pin, a release valve connected with one end of the supply and exhaust valve having a projecting stem, a vertically movable head normally erected by air pressure connection with the supply and exhaust valve and having a wing adapted to impart movement from the pin of the table to the stem of the release valve.

17. In an apparatus for pressing glass articles, the combination of a plunger cylinder and piston, a supply and exhaust valve therefor, a rotatable mold table having a projecting pin, a release valve connected with one end of the supply and exhaust valve having a spring-actuated projecting stem, a vertically movable head normally erected by air pressure connection with the supply and exhaust valve and having a wing adapted to impart movement from the pin of the table to the stem of the release valve.

18. In an apparatus for pressing glass articles, the combination of a plunger cylinder and piston, a supply and exhaust valve therefor, a rotatable mold table having a projecting pin, a release valve connected with one end of the supply and exhaust valve having a projecting stem, a vertically movable head normally erected by air pressure connection with the supply and exhaust valve and having a wing adapted to impart movement from the pin of the table to the stem of the release valve, and a torsion spring adapted to impart downward and rotatable movement to said head and wing.

19. In an apparatus for pressing glass articles, the combination with a plunger-actuating cylinder, of a valve controlling circulation thereto, a conduit for exhausting pressure from one end of the valve to effect its shifting, a valve 4 for said conduit having a resisting spring tending to normally close it, and means for unseating said conduit valve.

20. The combination with the plunger cylinder and its valve, of a timer device consisting of an apertured casing having a check valve controlling flow from one end of the cylinder valve to the interior of the casing, a gravitating spindle, a piston thereon adapted to unseat the check valve, and means controlling inflow of air above the piston, substantially as set forth.

21. The combination with the plunger cylinder and its valve, of a timer device consisting of an apertured casing having a check valve controlling flow from one end of the cylinder valve to the interior of the casing, a gravitating spindle, a piston thereon adapted to unseat the check valve, an air inlet port opening into the casing above the piston, and an adjustable stem having a port registering with said port.

22. The combination with the plunger cylinder and its valve, of a timer device consisting of an apertured casing having a check valve controlling flow from one end of the cylinder valve to the interior of the casing, a gravitating spindle, a piston thereon adapted to unseat the check valve, an air inlet port opening into the casing above the piston, and an adjustable stem having a port registering with said port and an indicating arm, substantially as set forth.

23. The combination with the plunger cylinder and its valve, of a timer device consisting of an apertured casing having a check valve controlling flow from one end of the cylinder valve to the interior of the casing, a gravitating spindle, a piston thereon adapted to unseat the check valve, an air inlet port opening into the casing above the piston, an adjustable stem having a port registering with said port and an indicating arm, and an outlet port above the piston having a check valve, substantially as set forth.

24. The combination with the plunger cylinder, piston and plunger stem, plunger cylinder valve, timer device and its valve-controlled connection with said valve, and the gravitating spindle of the timer; of an arm secured to the plunger spindle having an adjustable latch adapted to engage underneath the spindle and to be thrown out from engagement therewith.

25. In a glass pressing machine having a mold carrier, a plunger, and actuating mechanism therefor depending on movement of the mold carrier, means for rendering the plunger and its actuating mechanism inoperative independent of the mold carrier.

26. In a glass pressing machine having a mold carrier, a plunger, an actuating plunger head and cylinder therefor, a controlling valve for said cylinder, a pressure supply connection thereto, an exhaust conduit therefrom having a release valve, an independent pressure pipe connected with the plunger cylinder valve and with the opposite end of the plunger cylinder and having at its terminal a vertically reciprocable pressure-actuated head adapted to be engaged by an abutment on the mold carrier and to be brought into operative engagement with said release valve, and a cut-out valve in said pressure pipe for rendering said pressure-actuated head inoperative.

In testimony whereof I hereunto affix my signature in the presence of two witnesses.

WILLIAM J. MILLER.

Witnesses:
H. HECK,
C. M. CLARKE.